United States Patent [19]

Crawford

[11] Patent Number: 4,989,142
[45] Date of Patent: Jan. 29, 1991

[54] THREE-DIMENSIONAL IMAGES OBTAINED FROM TOMOGRAPHIC SLICES WITH GANTRY TILT

[75] Inventor: Carl R. Crawford, Milwaukee, Wis.

[73] Assignee: General Electric Company, Milwaukee, Wis.

[21] Appl. No.: 261,534

[22] Filed: Oct. 24, 1988

[51] Int. Cl.⁵ .......................... A61B 6/03; G06F 15/66
[52] U.S. Cl. ................................................ 364/413.15
[58] Field of Search ...................... 364/413.15; 378/17, 378/197

[56] References Cited

U.S. PATENT DOCUMENTS 4,117,337  9/1978  Staats ..................................... 378/17

FOREIGN PATENT DOCUMENTS 0278976  12/1986  Japan .

OTHER PUBLICATIONS

Veiga-Pires, J. A. et al., "Preliminary Report on a New Method of Whole Body CT-Scanning", *Computerized Tomography*, vol. 3, No. 3, 1979, 221-4.
Yueh, N. et al., "Gantry Tilt Technique for CT-Guided Biopsy and Drainage", *Journal of Computer Assisted Tomography*, vol. 13, No. 1, Jan-Feb. 1989, 182-4.

*Primary Examiner*—Clark A. Jablon
*Attorney, Agent, or Firm*—James O. Skarsten; Douglas E. Stoner

[57] ABSTRACT

Three-dimensional images are formed from tomographic data collected such that each two-dimensional slice is tilted with respect to the transverse slice direction. Geometric distortion in the reconstructed 3-D image caused by the slice tilt is removed either during extraction of the 3-D surface from the tomographic data or during rendering of the final surface using a matrix transformation.

3 Claims, 4 Drawing Sheets

THREE-DIMENSIONAL IMAGES OBTAINED FROM TOMOGRAPHIC SLICES WITH GANTRY TILT

The present application is related to U.S. Ser. No. 261,533, now U.S. Pat. No. 4,914,589, and to U.S. Ser. No. 261,532, filed of even date herewith; and to U.S. Ser. No. 125,662, U.S. Ser. No. 125,510, now U.S. Pat. No. 4,885,688, and U.S. Ser. No. 125,426, now U.S. Pat. No. 4,868,748, all three of which were filed on Nov. 25, 1987.

BACKGROUND OF THE INVENTION

The present invention relates in general to three-dimensional (3-D) display of tomographic data, and more specifically to forming 3-D images from a tomographic data set in which the axial slices are acquired with a gantry tilt.

Tomographic medical imaging employs the collection of data representing cross sections of a body. A plurality of object interrogations can be processed mathematically to produce representations of contiguous cross-sectional images. Such cross-sectional images are of great value to the medical diagnostician in a non-invasive investigation of internal body structure. The technique employed to collect the data can be x-ray computed tomography, nuclear magnetic resonance tomography, single-photon emission tomography, positron emission tomography, or ultrasound tomography, for example.

A body to be imaged exists in three dimensions. Tomographic devices process data for presentation as a series of contiguous cross-sectional slices along selectable axes through the body. Each cross-sectional slice is made up of a number of rows and columns of voxels (parallelopiped volumes with certain faces corresponding to pixel spacing within each slice and others corresponding to slice spacing), each represented by a digitally stored number related to a computed signal intensity in the voxel. In practice, an array of, for example, 64 slices may each contain 512 by 512 voxels. In normal use, a diagnostician reviews images of a number of individual slices to derive the desired information. In cases where information about a surface within the body is desired, the diagnostician relies on inferences of the 3-D nature of the object derived from interrogating the cross-sectional slices. At times, it is difficult or impossible to attain the required inference from reviewing contiguous slices. In such cases, a synthesized 3-D image would be valuable.

Synthesizing a 3-D image from tomographic data is a two-step process. In the first step, a mathematical description of the desired object is extracted from the tomographic data. In the second step, the image is synthesized from the mathematical description.

Dealing with the second step first, assuming that a surface description can be synthesized from knowledge of the slices, the key is to go from the surface to the 3-D image. The mathematical description of the object is made up of the union of a large number of surface elements (SURFELS). The SURFELS are operated on by conventional computer graphics software, having its genesis in computer-aided design and computer-aided manufacturing, to apply surface shading to objects to aid in image interpretation through a synthesized two-dimensional image. The computer graphics software projects the SURFELS onto a rasterized image and determines which pixels of the rasterized image are turned on, and with what intensity or color. Generally, the shading is lightest (i.e., most intense) for image elements having surface normals along an operator-selected line of sight and successively darker for those elements inclined to the line of sight. Image elements having surface normals inclined more than 90 degrees from the selected line of sight are hidden in a 3-D object and are suppressed from the display. Foreground objects on the line of sight hide background objects. The shading gives a realistic illusion of three dimensions.

Returning now to the problem of extracting a mathematic description of the desired surface from the tomographic slice data, this step is broken down into two subtasks, namely the extraction of the object from the tomographic data, and the fitting of a surface to the extracted object. A number of ways are available to do the first subtask. For example, it is possible to search through the signal intensities in the voxels of a slice to discern regions where the material forming the object has sufficient signal contrast with surrounding regions. For example, signal intensities characteristic of bone in x-ray computed tomography have high contrast with surrounding tissue. A threshold may then be applied to the voxels to identify each one in the complete array lying in the desired object from all voxels not in the object.

Referring now to the second subtask, one technique for fitting a 3-D surface to the extracted object is known as the dividing cubes method which is disclosed in commonly assigned U.S. Pat. No. 4,719,585, issued Jan. 12, 1988, which is hereby incorporated by reference. By the dividing cubes method, the surface of interest is represented by the union of a large number of directed points. The directed points are obtained by considering in turn each set of eight cubically adjacent voxels in the data base of contiguous slices. Gradient values are calculated for these large cube vertices using difference equations. The vertices are tested against a threshold to determine if the surface passes through the large cube. If it does, then the large cube is subdivided to form a number of smaller cubes, referred to as subcubes or subvoxels. By interpolation of the adjacent point densities and gradient values, densities are calculated for the subcube vertices and a gradient is calculated for the center of the subcube. The densities are tested (e.g., compared to the threshold). If some are greater and some less than the threshold, then the surface passes through the subcube. In that case, the location of the subcube is output with its normalized gradient, as a directed point. It is also possible to define a surface using a range of densities (e.g., an upper and a lower threshold). Thus, where thresholds are mentioned herein, a range is also intended to be included. The union of all directed points generated by testing all subcubes within large cubes through which the surface passes, provides the surface representation. The directed points are then rendered (i.e., rasterized) for display on a CRT, for example.

A plurality of parallel tomographic slices can be acquired for a 3-D volume covering an area of interest in an object (e.g., a medical patient) such that each slice is perpendicular to a longitudinal axis of the object. This axis defines the direction along which the slices are spaced and typically coincides with an axis of a Cartesian coordinate system used to specify locations within the object. It is also common to acquire slices which are tilted from the usual perpendicular orientation to better visualize certain structures within a body. For example, slices at angles other than 90° to the longitudinal axis of a medical patient (i.e., non-transverse slices) might be preferred when studying certain internal organs. Such slices are acquired with CT apparatus, for example, by providing a tilt to the gantry, whereby the axis of rotation of the x-ray fan beam is inclined to the axis of the patient. Slanted slices can be obtained in an NMR examination by appropriate control of the magnetic field gradients.

The use of tomographic slices acquired with a tilt as input data for extracting a 3-D surface by the dividing cubes method results in a geometrically distorted image. The distortion arises due to location errors along the longitudinal (z-axis) direction for the directed points. Accordingly, it is a principal object of the present invention to provide 3-D surface representations of objects contained in tomographic data slices, which slices are tilted with respect to an axis of the tomographic data.

It is a further object of the invention to modify the dividing cubes method to provide 3-D images from tilted tomographic slices without geometric distortion.

SUMMARY OF THE INVENTION

These and other objects are achieved in a method for generating a surface within a body from a plurality of substantially parallel tomographic slices collected along an axis in a body, the slices being acquired such that each is inclined by a tilt angle A from an imaginary line perpendicular to the axis in the body. The distortion of a resulting 3-D image is avoided by correcting the spatial locations of the points defining the surface.

Extraction of the surface is preferably performed using the dividing cubes method. The correction of the point locations can be done during or after the application of dividing cubes. If during, the y and z coordinates of each directed point are obtained according to a modified formula. If after, the distortion is corrected by application of a particular matrix transformation during rendering of the surface into an image to be displayed.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings in which:

DETAILED DESCRIPTION OF THE PREFERRED EMBODIMENTS

Figure 1:
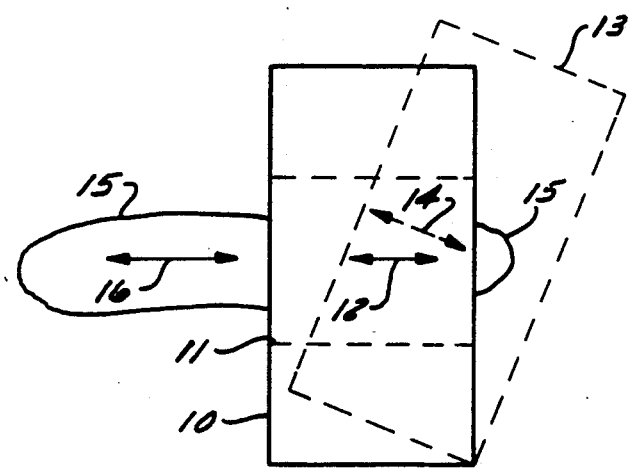
FIG. 1 is a side view of a tiltable CT gantry receiving a body to be imaged.

Referring to FIG. 1, an example of tomographic slices obtained using computed tomography (CT) will be described in connection with a CT apparatus including a gantry 10 having a central aperture 11 for receiving a body 15 to be imaged. An x-ray source (not shown) is contained within gantry 10 and rotates about an axis of rotation 12 such that an x-ray fan beam scans body 15. After transmission through body 15, the fan beam is received by a ring of detectors (not shown) to obtain slice information which may be reconstructed by a computer (not shown) to form a two-dimensional slice image.

When acquiring a plurality of slices in order to study three-dimensional structures, body 15 is advanced along an axis 16 through gantry 10 such that successive parallel slices of body 15 intersect the fan beam. Transverse slices of body 15 result when gantry 10 is vertical so that axes 12 and 16 are parallel. Tilted slices result when gantry 10 is moved to an inclined position shown at 13 such that rotation of the x-ray fan beam is along axis 14, in which case the axis of fan beam rotation 14 and the axis of slice progression 16 are non-parallel.

Figure 2A:
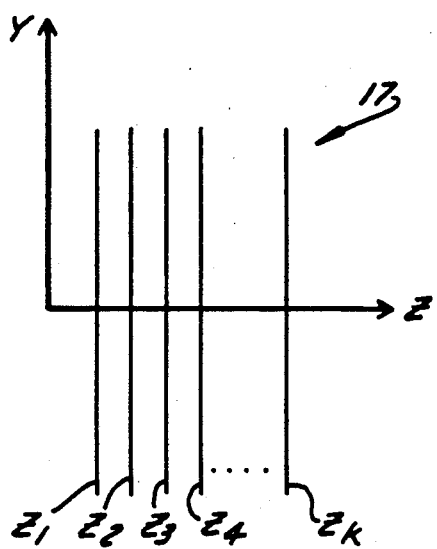
FIGS. 2A and 2B show the orientation of non-tilted and tilted slices, respectively.
Figure 2B:
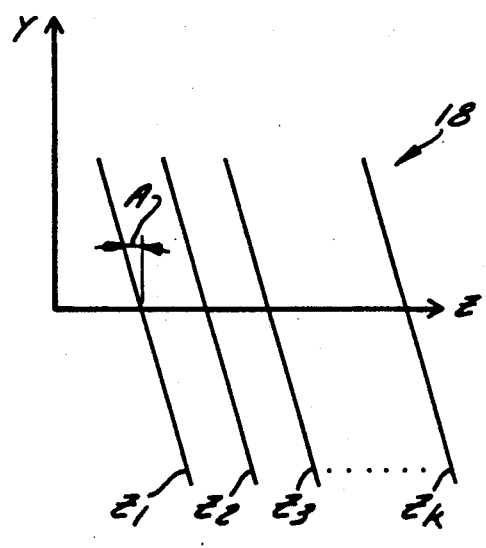

The case of transverse slices is shown in FIG. 2A. Axis z is conincident with axis 16 in FIG. 1. The y axis is a vertical axis which is parallel to transverse slices 17, which are designated $z_1, z_2, \ldots z_k$. FIG. 2B shows tilted slices 18, which are acquired with a gantry tilt, for example, such that they are inclined from the y-axis by an angle A. All of slices 17 and 18 are parallel to the x-axis (which is perpendicular to the planes of FIGS. 1, 2A, and 2B).

Figure 3:
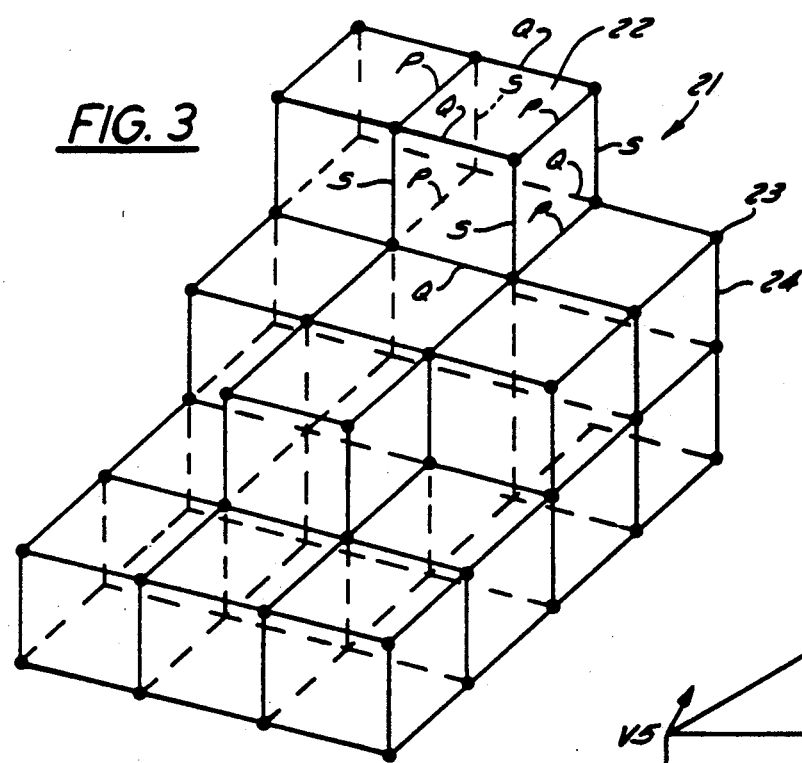
FIG. 3 represents a portion of an array of tomographic data from which a surface is to be extracted.

Once all slices are collected and reconstructed (by any well-known means, such as convolution-backprojection) to provide a plurality of 2-D images each consisting of a 2-D matrix of data points representing the physical property detected by the particular modality used (e.g., CT), a 3-D surface must be formed from the slice images. Referring to FIG. 3, a part of a 3-D tomographic array 21 is shown including a plurality of cubes 22 defined by nodes 23 connected by edges 24. Each node 23 represents a signal amplitude of a voxel (i.e., data point) of tomographic data and each edge 24 represents the distance from one voxel to its neighbor. Although the volumes described are referred to as cubes, edges 24 are typically not all of equal length since slice spacing is usually not equal to pixel spacing. Pixel spacings P and Q and slice spacing S are shown for cube 12.

Figure 4:
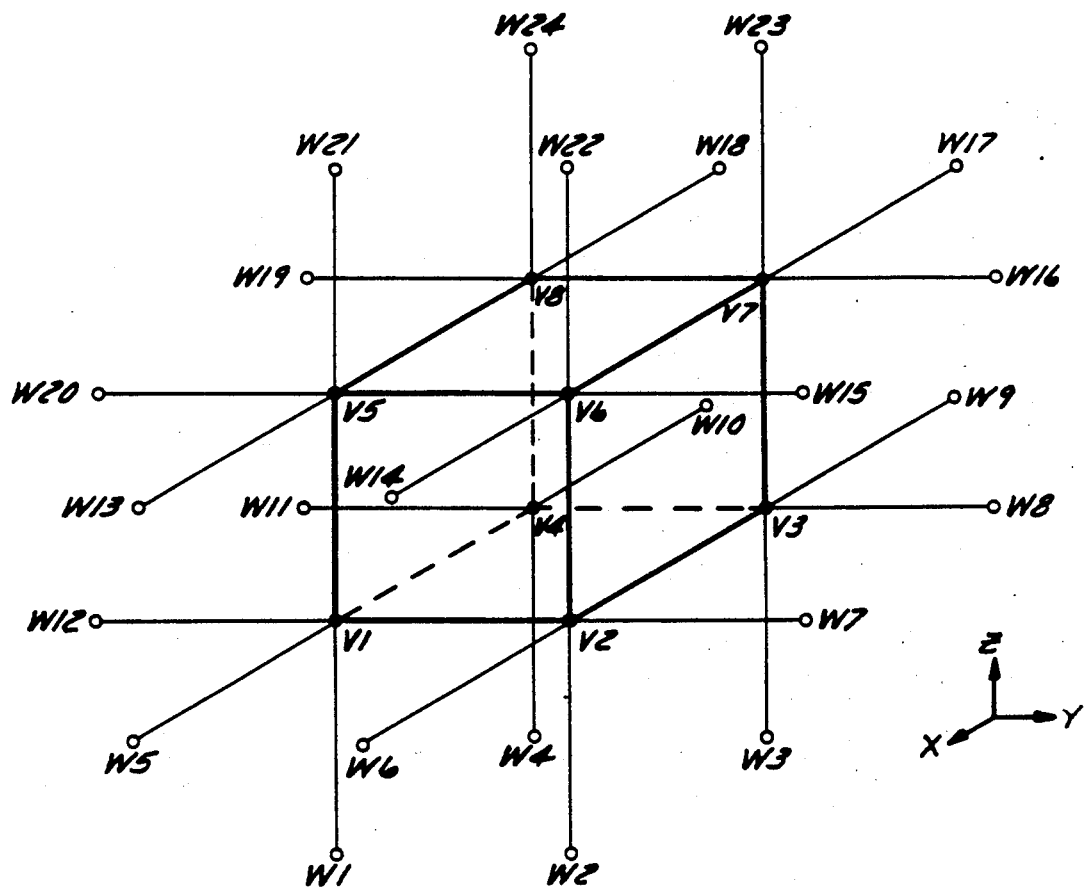
FIG. 4 is a perspective view showing a large cube and its adjacent data points.

In the practice of dividing cubes, each large cube containing the surface to be displayed (as determined by comparisons with a threshold) is subdivided by integer factors (greater than or equal to zero) into a number of subcubes. The vertices of the subcubes are compared to the threshold (or thresholds) to identify subcubes through which the surface passes. For such identified subcubes, the subcube location and normalized gradient for the subcube center are concatenated resulting in a directed point. The process of subdivision uses a large cube and adjacent points as shown in FIG. 4. Cubically adjacent voxels from the tomographic data are selected to represent the vertices V1-V8 of the large cube. Points W1-W24 are adjacent to V1-V8 and are used in conjunction with V1-V8 to calculate the gradients at the vertices of the large cube. Interpolation can then be performed on the cube and the gradients.

Figure 5:
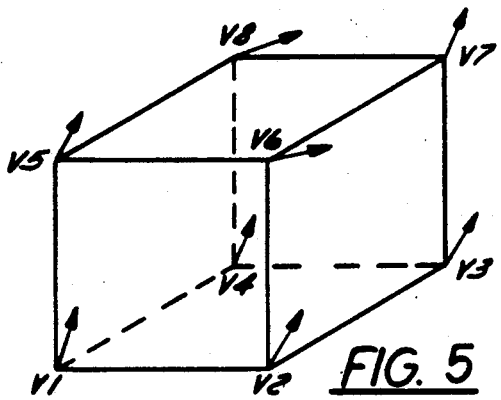
FIG. 5 shows the gradient normals associated with each cube vertex.
Figure 6:
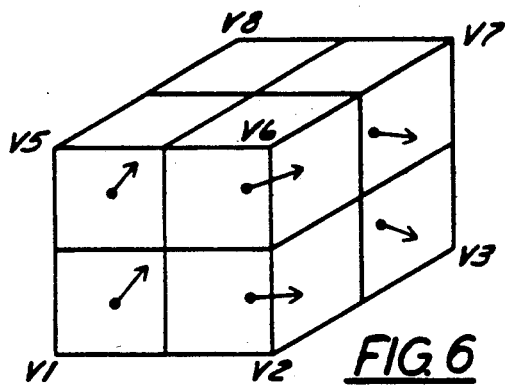
FIG. 6 shows subcubes and their gradient normals.
Figure 7:
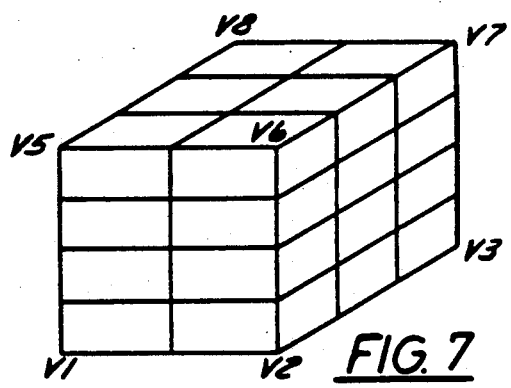
FIG. 7 shows subdivision using a different amount of interpolation than FIG. 6.

FIG. 5 shows examples of gradients associated with the vertices of a cube. FIG. 6 represents interpolated subcubes and gradient normals which define the subcubes within the large cube. FIG. 7 shows subcubes having different interpolation factors along different axes.

Figure 8:
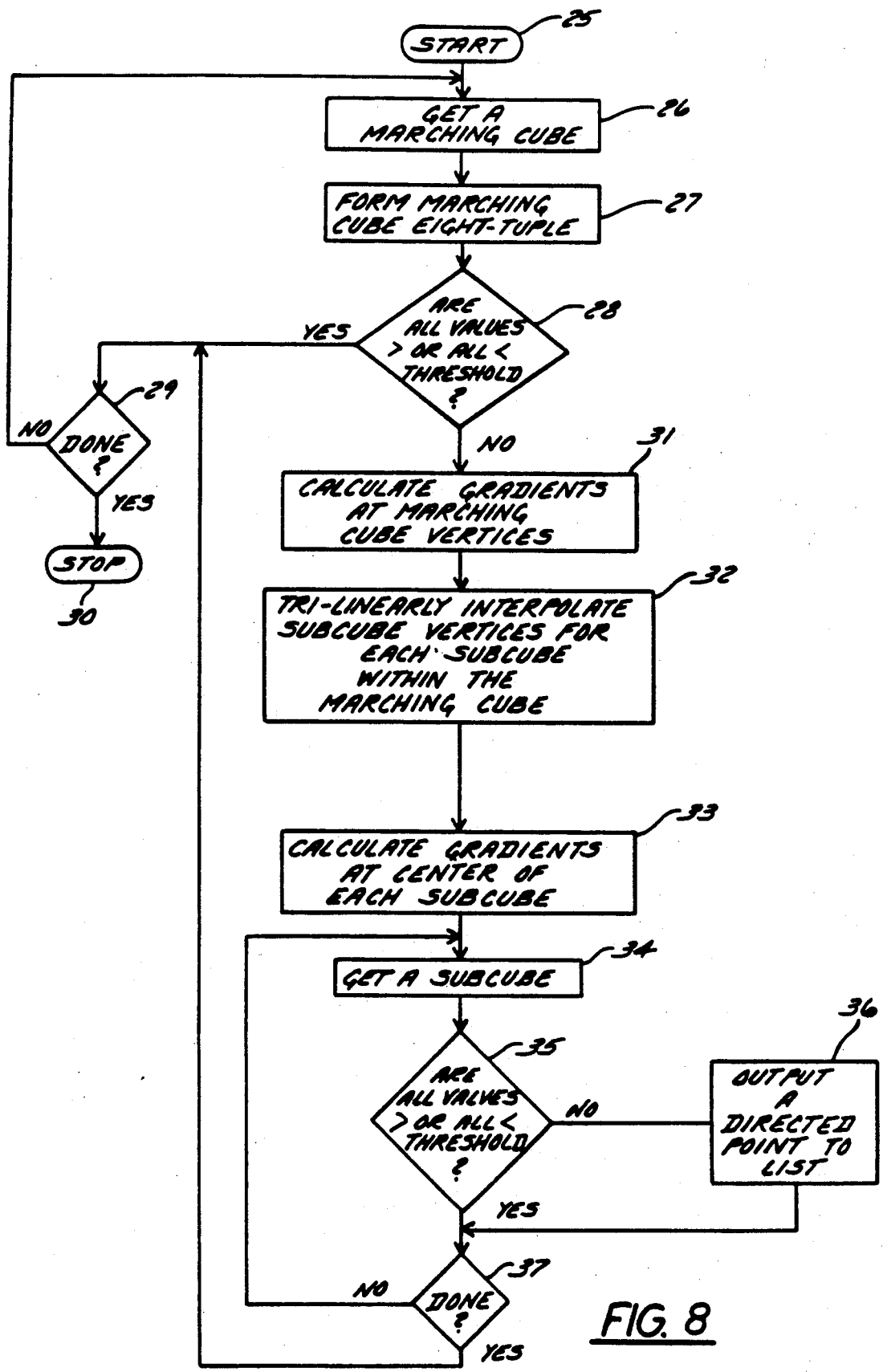
FIG. 8 is a flow chart according to the dividing cubes method.

The modified dividing cubes method of the invention will be described in more detail with reference to the flow chart in FIG. 8, which begins at start block 25. In steps 26 and 27, a large cube (i.e., marching cube) is obtained consisting of an eight-tuple of density functions $f(x,y,z)$, namely $[f(i,j,k), f(i+1,j,k), f(i,j+1,k), f(i+1,j+1,k), f(i,j,k+1), f(i+1,j,k+1), f(i,j+1,k+1), f(i+1,j+1,k+1)]$, where i is the row, j is the column, and k is the slice in the tomographic data. In a data base having N rows, N columns, and M slices (i.e., M is the number of NxN two-dimensional images), the marching cubes are obtained by looping through all combinations of $i=2,\ldots,N-1; j=2,\ldots,N-1;$ and $k=2,\ldots,M-1$.

For each large cube, the eight vertices are compared to a threshold T in step 28. If all of the values for the vertices are greater than the threshold or if all are less than the threshold, then the surface does not pass through the large cube, and so the method checks to see if all large cubes have been processed in step 29. If finished, then the method halts at stop block 30 and other functions may then be performed (such as rendering and display of the defined surface). Otherwise, a return is made to step 26 to begin processing another large cube.

If step 28 determines that there are vertices both above and below the threshold (or, alternatively, both inside and outside a threshold range), then gradient values are calculated at each of the large cube vertices in step 31. Central differences can be used to calculate gradient estimates $g(i,j,k) = [g_x(i,j,k), g_y(i,j,k), g_z(i,j,k)]$ for each vertex (i,j,k) in a large cube as follows:

$$g_x(i,j,k) = [f(i+1,j,k) - f(i-1,j,k)]c_1$$

$$g_y(i,j,k) = [f(i,j+1,k) - f(i,j-1,k)]c_2$$

$$g_z(i,j,k) = [f(i,j,k+1) - f(i,j,k-1)]c_3$$

where $c_1$, $c_2$ and $c_3$ are constants depending on the pixel spacing and the slice spacing in the tomographic data. Thus, eight values each of $g_x$, $g_y$ and $g_z$ are found.

Specifically, the values of $c_1$, $c_2$ and $c_3$ for each calculation are found according to:

$$c_1 = 1/(2*PIXEL_x)$$

$$c_2 = 1/(2*PIXEL_y)$$

$$c_3 = 1/(z_{k+1} - z_{k-1})$$

where $PIXEL_x$ and $PIXEL_y$ are the pixel spacings within the slice along the x- and y-axes, respectively, and $(z_{k+1} - z_{k-1})$ is the distance between the two slices on either side of slice k.

In step 32, density values are found for the subcube vertices by tri-linear interpolation. With positive integer interpolation factors A, B and C corresponding to i, j and k, subcube increments within a large cube are defined as $\Delta_i = 1/A$, $\Delta_j = 1/B$, and $\Delta_k = 1/C$, respectively. The vertices of each large cube v(i,j,k) are denoted as v(0,0,0), V(1,0,0), v(0,1,0), v(1,1,0), v(0,0,1), v(1,0,1), v(0,1,1), and v(1,1,1). Linear interpolation gives each subcube vertex density f'(I,J,K) defined as $f(i+I\Delta_i, j+J\Delta_j, k+K\Delta_k)$, where $I=0, 1, \ldots, A$, $J=0, 1, \ldots, B$, and $K=0, 1, \ldots, C$. In step 33, gradient values are calculated for the center of each subcube using tri-linear interpolation of the gradients at the large cube vertices $g_x$, $g_y$ and $g_z$. The subcube gradients (each a vector G(I,J,K) with components $g_x$, $g_y$ and $g_z$) for each of the x, y and z components are $G_{x,y,z}(I,J,K) = g_{x,y,z}(i+[I+0.5]\Delta_i, j+[J+0.5]\Delta_j, k+[J+0.5]\Delta_k)$, where $I=0,1,\ldots,A-1$, $J=0,1,\ldots,B-1$, and $K=0,1,\ldots,C-1$.

Following the calculations of the subcubes and their gradients, the subcubes are fetched one at a time in step 34 by looping through all combinations if $I=0,\ldots,A-1$, $J=0,\ldots B-1$, and $K=0,\ldots,C-1$. For each combination of I, J, and K, a subcube is defined by the eight-tuple $[f'(I,J,K), f'(I+1,J,K), f'(I,J+1,K), f'(I+1,J+1,k), f'(I,J,K+1), f'(I+1,J,K+1), f'(I,J+1,K+1), f'(I+1,J+1,K+1)]$. In step 35, the current subcube is tested against the threshold. If all subcube vertices are not either above or all below the threshold, then the location of the subcube and its normalized gradient are output to a list as a directed point in step 36, otherwise a check for completion is done in step 37. The gradient output to the list during step 36 is a normalized gradient defined as $G(I,J,K)/|G(I,J,K)|$.

For transverse slices, the coordinates in (x,y,z) of each subcube output as a directed point in step 36 are given by $$(PIXEL_x[i+I\Delta_i], PIXEL_y[j+J\Delta_j], z_k + K\Delta_k[z_{k+1} - z_k]).$$

However, for non-transverse slices, the (x,y,z) coordinates of a directed point as defined above will result in a geometric distortion of the surface representation because of the angle of inclination A. The geometric distortion can be corrected by redefining the (x,x,z) coordinates of each directed point as $$(PIXEL_x[i+I\Delta_i], COS(A)PIXEL_y[j+\Delta_jJ], z_k - SIN(A)PIXEL_y[j+\Delta_jJ] + K\Delta_k[z_{k+1} - z_k]).$$

When all subcubes have been processed, step 37 branches back to step 29 to process the next large cube.

Figure 9:
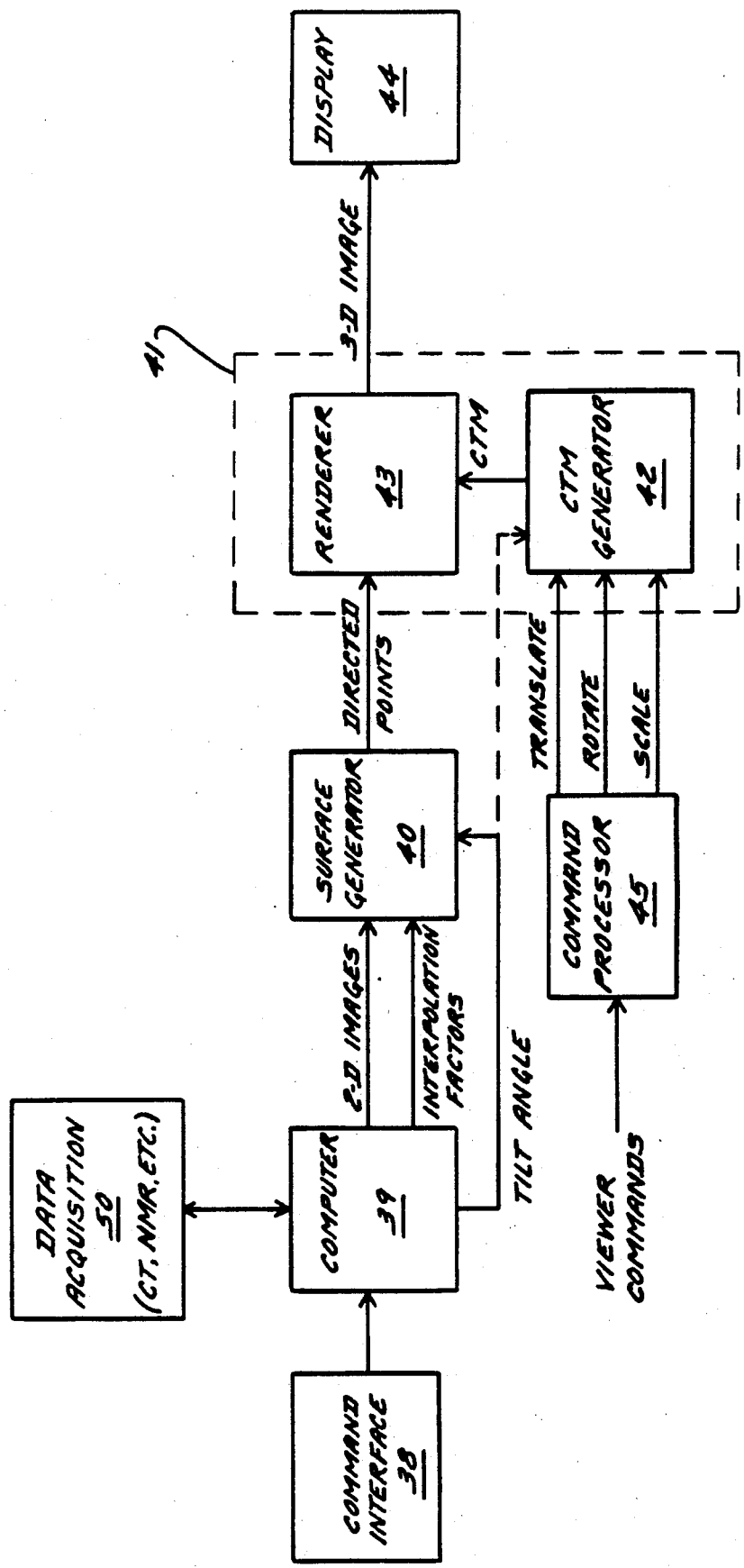
FIG. 9 is a block diagram of processing hardware in one embodiment of the invention.

A preferred apparatus for practicing the invention is shown in FIG. 9. A data acquisition system 50 collects tomographic data slices of a subject under control of a computer 39. An operator provides commands via a command interface 38 to computer 39 in order to control slice locations and spacing, for example. Computer 39 reconstructs two-dimensional tomographic images from the data collected by data acquisition system 50. The tomographic images are provided to a surface generator 40. Computer 39 also provides values for the interpolation factors for forming subcubes to surface generator 40. Surface generator 40 implements the dividing cubes method to generate a number of directed points defining the surface that are fed to a display processor 41 which includes a Current-Transformation-Matrix (CTM) generator 42 and a renderer 43.

Rather than correct for geometric distortion from tilted slices by redefining the coordinates of each directed point as mentioned above, the distortion can be removed during rendering of the image by renderer 43. Thus, a transformation is included in the CTM which is selected to remove the location errors in the directed points. Such a transformation may preferably be accomplished using a shear matrix of the form:

$$\begin{vmatrix} 1 & 0 & 0 \\ 0 & \cos(A) & -\sin(A) \\ 0 & 0 & 1 \end{vmatrix}$$

CTM generator 42 receives a viewer's commands via a command processor 45 for scaling, moving and rotating the object and forms the CTM which is provided to renderer 43 to operate on the directed points. Tilt angle A is provided by computer 39 either to surface generator 40 for redefining directed point locations or to CTM generator 42 so that the shear matrix can be concatenated with the CTM. Renderer 43 synthesizes the 3-D image (including projecting directed points onto 3-D pixels and determining shading of illuminated pixels) which is rasterized and sent to display 44 which could be a cathode-ray tube (CRT), for example.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A method for generating a three-dimensional image of a surface within a body from a plurality of substantially parallel tomographic slices collected along an axis in said body, said method comprising the steps of:
   acquiring said plurality of tomographic slices of said body such that each of said slices is inclined by a tilt angle A from an imaginary line perpendicular to said axis;
   extracting a plurality of data elements which collectively define said surface from said slices such that said surface is geometrically distorted because of said tilt angle A;
   generating said three-dimensional image of said surface from said plurality of data elements; and
   performing a matrix transformation as part of said image generating step to remove said geometric distortion of said surface.

2. The method of claim 1 wherein said matrix transformation includes a shear matrix of the form:

$$\begin{vmatrix} 1 & 0 & 0 \\ 0 & \cos(A) & -\sin(A) \\ 0 & 0 & 1 \end{vmatrix}$$

3. A method for generating a three-dimensional image of a surface within a body from a plurality of tomographic slices substantially parallel to an x-axis and collected along a z-axis in said body, said method comprising the steps of:
   acquiring said plurality of tomographic slices of said body each at a respective location $z_k$ along said z-axis, each slice being inclined by a tilt angle A from an imaginary line perpendicular to said z-axis; and
   extracting said surface substantially without geometric distortion using a dividing cubes method for generating a plurality of subcubes for defining said surface, the location of each subcube within a large cube at coordinates (i,j,k) having y and z components determined according to:

$$y = \cos(A) \text{PIXEL}_y (j + J \Delta_j) \text{ and}$$

$$z = z_k - \sin(A) \text{PIXEL}_y (j + J \Delta_j) + K \Delta_k [z_{k+1} - z_k]$$

where $\text{PIXEL}_y$ is the spacing between slice data point in the y-direction perpendicular to said x-axis and said z-axis, $\Delta_j$ is the size of a subcube in said y-direction, J is the order of a subcube within its large cube, and $z_k$ is the location of a slice bounding said large cube.

* * * * *